June 13, 1967 A. BRUEDER 3,325,224
DEVICES FOR DISTRIBUTING THE BRAKING EFFORT
BETWEEN THE AXLES OF AN AUTOMOTIVE VEHICLE
Filed Oct. 4, 1966
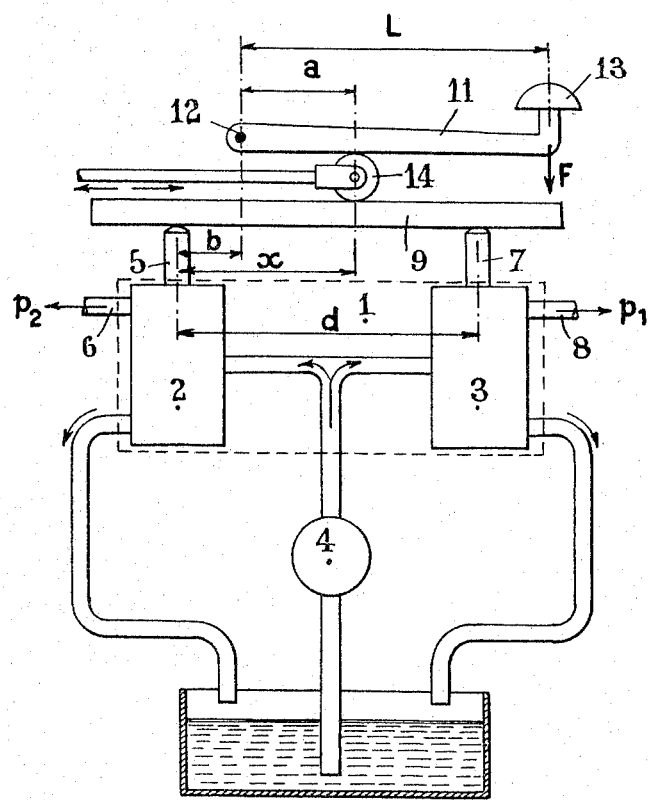

United States Patent Office 3,325,224
Patented June 13, 1967

3,325,224
DEVICES FOR DISTRIBUTING THE BRAKING EFFORT BETWEEN THE AXLES OF AN AUTOMOTIVE VEHICLE
Antoine Brueder, Paris, France, assignor to Societe Anonyme Andre Citroen, Paris, France
Filed Oct. 4, 1966, Ser. No. 584,273
Claims priority, application France, Dec. 5, 1963, 956,148, Patent 1,385,636
2 Claims. (Cl. 303—6)

This is a continuation-in-part of my prior application Ser. No. 416,207, filed Dec. 7, 1964, now abandoned.

This invention relates to improvements in devices for distributing the braking effort between the axles of an automotive vehicle equipped with a hydraulic braking system.

Braking effort distributing devices are already known. A typical device of this character, adapted to distribute the braking effort between the axles of an automotive vehicle as a function of the load supported by the axle on which nearly the whole of the variation in weight of the vehicle is caused to bear, is described in my Patent No. 2,976,084. This braking effort distributing device comprises two reaction-type slide-valve distributors proper controlling respectively the braking pressure exerted on the rear wheels and the front wheels respectively. The braking effort is distributed between the front and rear axles by displacing the point of application of the effort on a rocking member bearing with its ends on one and the other slide valves respectively.

This point of application of the braking effort is materialized by a roller adapted to be depressed by the driver through the medium of a brake pedal fulcrumed about a pivot having a pin fixed axis with respect to the vehicle frame. It was observed that the structure set forth in the U.S. Patent No. 2,976,084 as well as similar structures known in the art are objectionable in that the pressure to be exerted by the driver on the brake pedal to produce the same braking force varies within large limits according to the vehicle load and increases with this load.

One object of the present invention is to provide a braking effort distributor of the general type set forth hereinabove wherein the pressure to be exerted by the driver of the vehicle on the brake pedal for producing a same braking force varies slightly or remains invariable in spite of changes in the vehicle load.

It is another object of this invention to provide a braking effort distributor of the type broadly set forth hereinabove, wherein the axis about which the brake pedal is fulcrumed on the vehicle frame is so located that the pressure to be exerted by the driver's foot on the brake pedal varies only slightly with the vehicle loads, or even remains strictly constant in spite of changes in the vehicle load.

In order to afford a clearer understanding of the invention and of the manner in which the same may be carried out in practice, reference will now be made to the accompanying drawing of which the single figure illustrates diagrammatically a braking-effort distributor constructed according to the teachings of this invention.

The figure shows the essential component elements of the braking-effort distributor described in detail in the aforesaid patent.

The braking-effort distributor 1 comprises two reaction-type slide-valve distributors 2, 3 connected to a source of liquid under pressure 4. The distributor 2 comprising a reaction slide valve 5 controls the braking pressure applied through a pipe line 6 to one of the axles of the vehicle. Similarly, the other distributor 3 comprises a reaction slide valve 7 controlling the braking pressure transmitted through another pipe line 8 to the other axle of the vehicle.

The rods of slide valves 5 and 7 bear against a rocking member 9 responsive to a brake pedal lever 11 fulcrumed at 12 and actuated through the brake pedal knob 13. A roller 14 is interposed between the brake pedal lever 11 and the rocking member 9, the position of this roller 14 being adjusted as a function of the variation in weight of the vehicle by means described in detail in the aforesaid patent.

According to this invention, and as shown in the drawing, the pivot pin 12 of the brake pedal 11–13 is disposed between the axles of slide valves 5 and 7 and nearer to the slide valve 5 controlling the highest pressure. The following disclosure will prove that with this specific arrangement it is possible to reduce or even to reduce to zero the variation in the effort exerted on the pedal F, which variation was in hitherto known devices subordinate to the vehicle load.

Thus, according to this invention the distributor 2 is the one associated with the rear axle of the vehicle of which the braking pressure undergoes the greatest variations as a function of the vehicle load, the other distributor 3 controlling the braking pressure applied to the front axle.

A simple calculation will show how to determine the proportions to be adhered to when constructing a device of this character. Assuming that $F$ = braking effort on pedal under load,
$F_0$ = braking effort on pedal under zero load,
$L$ = length of brake pedal lever,
$a$ = distance from contact line of roller 14 to pedal fulcrum,
$b$ = distance from axis of slide valve 5 controlling the axle (for example the rear axle) subjected to the greatest load variation, to the pedal fulcrum,
$d$ = distance between axis of slide valves 5 and 7,
$x$ = distance from contact line of roller 14 to axis of slide valve 5,
$p_1$ = pressure delivered by the front axle distributor 3 to the front brake or axle having a moderate load variation, in load condition of the vehicle,
$p_{01}$ = aforesaid pressure under no-load conditions,
$p_2$ = pressure delivered by the rear axle distributor 2 to the rear brake or axle having the greatest load variation, in load condition of the vehicle,
$p_{02}$ = aforesaid pressure under no-load conditions,
$s$ = surface area of slide valves,
$\alpha$ and $\beta$ = constant coefficients depending on the characteristics of the braking members and their control means,
$P$ = permissible vehicle load (difference between no-load and full-load weights).

The pressures under no-load and full-load conditions will be expressed in a simplified manner, as follows:

$$p_1 = p_{01} + \alpha P$$
$$p_2 = p_{01} + \beta P \qquad (1)$$

The brake pedal effort is:

$$F = (p_1 s + p_2 s)\frac{a}{L} = (p_1 + p_2) s \frac{x-b}{L}$$

The rocker member is in a state of balance when:

$$x p_2 = (d-x) p_1$$
$$x(p_1 + p_2) = d p_1$$
$$x = \frac{d p_1}{p_1 + p_2}$$

This value gives the following expression for the effort F:

$$F = \frac{1}{L}(p_1+p_2)\left(\frac{dp_1}{p_1+p_2} - b\right)$$

or $$F = \frac{s}{L}[dp_1 - b(p_1+p_2)] \quad (2)$$

Under no load condition of the vehicle said formula becomes $$F_0 = \frac{s}{L}[dp_{01} - b(p_{01}+p_{02})] \quad (3)$$

By substraying member to member Formulae (2) and (3) and take in account both Formulae (1) it appears $$F - F_0 = \frac{sP}{L}[d\alpha - b(\alpha+\beta)]$$

The structural condition to equalize the pressure to be exerted by the driver on the brake pedal in no load and full load condition of the vehicle is also given by $$b = \frac{\alpha}{\alpha+\beta}d \quad (4)$$

From the definition of the characteristics $\alpha$ and $\beta$ given in Formulae 1 it appears that in all cases, $$\beta > \alpha$$

and that the value of $b$ given by Formula 4 is therefore lower than $d/2$. To obtain the equalization of the braking effort under different vehicle load conditions it is thus necessary to position the pivot pin 12 of the brake pedal 11–13 between the axes of the two slide valves 5 and 6 and nearer to that one 5 of these two slide valves which corresponds to the braking of the axle carrying the heaviest load.

To keep the pushing to be exerted by the driver on the brake pedal at an exactly constant value for all loads of the vehicle, it is sufficient to position the pivot point according to the above Formula 4. In said formula the characteristics $\alpha$ and $\beta$ may be replaced by proportional numbers and as it appears from Formulae 1 that, $$\frac{\alpha}{p_1-p_{01}} = \frac{\beta}{p_2-p_{02}}$$

it can be brought to such proportional numbers the differential pressures $p_1-p_{01}$ and $p_2-p_{02}$, being the pressure increases of the hydraulic braking fluid between no loaded and loaded vehicle, respectively for the most loaded and the less loaded axle. Said two differential pressures may be calculated in each case by the builder, according to the specific data of the vehicle to be equipped.

What I claim is:

1. In a vehicle having two axles of which one is more loaded than the other and equipped with a hydraulic system for braking said two axles, said hydraulic braking system comprising two reaction distributors having slide valves disposed with their axles parallel to each other and adapted to control the braking of the two axles through thrust exerted by said slide valves; a braking effort distributor comprising a rocker bearing against the two slide valves, a roller bearing against the rocker between the two slide valves and distributing, between the two slide valves, the thrust received in a manner responsive to the position occupied by said roller between the axles of the two slide valves, a brake pedal for depressing said roller under the control of the driver during brake applications, and a pivot pin about which said brake pedal is pivotally mounted; wherein the pedal pivot axis is disposed intermediate the two axes of said slide valves and nearer to the axis of the slide valve of the distributor controlling the braking of the more loaded axle.

2. A braking effort distributor as set forth in claim 1, wherein the parallel axis of said two slide valves are separated by a distance $d$ and adapted to ensure the equality of the braking effort to be exerted on the brake pedal for the unloaded vehicle and for the loaded vehicle, wherein the distance of the fulcrum of the brake pedal from the axis of the slide valve controlling the braking of the more loaded axle is a fraction $\alpha/\alpha+\beta$ of said distance $d$, $\alpha$ and $\beta$ being numbered proportional to the pressure increment of the hydraulic braking fluid between the unloaded vehicle and the loaded vehicle, respectively, for the less loaded and for the more loaded axle.

No references cited.

EUGENE G. BOTZ, *Primary Examiner.*